United States Patent [19]

Markowitz

[11] Patent Number: 5,513,254
[45] Date of Patent: Apr. 30, 1996

[54] METHOD AND APPARATUS FOR PROCESSING FACSIMILE TRANSMISSIONS

[75] Inventor: Robert E. Markowitz, Glen Rock, N.J.

[73] Assignee: AT&T Corp., Murray Hill, N.J.

[21] Appl. No.: 365,611

[22] Filed: Dec. 28, 1994

[51] Int. Cl.$^6$ .................................................. H04M 11/00
[52] U.S. Cl. ............................ 379/100; 379/96; 358/400; 358/407; 358/468
[58] Field of Search ............................... 379/100, 96–98, 379/93, 90, 110; 348/14–17; 358/400–403, 407, 434–440, 442, 444, 468

[56] References Cited

U.S. PATENT DOCUMENTS

| | | | |
|---|---|---|---|
| 5,305,195 | 4/1994 | Murphy | 364/401 |
| 5,450,123 | 9/1995 | Smith | 348/17 |

Primary Examiner—Wing F. Chan
Attorney, Agent, or Firm—Eugene J. Rosenthal

[57] ABSTRACT

A telephone network carrying a facsimile transmission transmitted by a user from a facsimile transmission source modifies the user's facsimile transmission by incorporating with the user's facsimile information at least one advertisement, so as to form a combination facsimile transmission that is transmitted to a destination specified by the user. Ultimately, when the facsimile is printed or displayed, the advertisement will be printed or displayed as well. One or more "sheets" of facsimile information contained within the original facsimile transmission of the user may have an advertisement included therewith. The advertisement incorporated with each sheet may, but need not, be the same. The particular advertisements being incorporated with the user's facsimile information are independent of the content of the user's facsimile information, although they may be selected as a function of one or more parameters of the call over which the facsimile transmission travels. Depending on the option chosen, the advertisement may a) be placed into any available "white space" in which it will fit on the sheet of the facsimile information, i.e., the advertisement will not overwrite any of the user's facsimile information, b) be placed in available white space only in the margin areas of the sheet, or c) the image of the sheet may be shrunk slightly and the advertisement placed in the resulting available white space. Optionally, in exchange for agreeing to the inclusion of the advertisement the facsimile transmitter and/or the facsimile receiver are granted a discount on the cost of the call.

37 Claims, 4 Drawing Sheets

ORIGINAL SENT TO SERVER

PROCESSED VERSION SENT FROM SERVER

FIG. 4B

ORIGINAL SENT TO SERVER

PROCESSED VERSION SENT FROM SERVER

FIG. 4C

ORIGINAL SENT TO SERVER

PROCESSED VERSION SENT FROM SERVER

METHOD AND APPARATUS FOR PROCESSING FACSIMILE TRANSMISSIONS

TECHNICAL FIELD

This invention relates to the processing of facsimile transmissions in a communications network.

BACKGROUND OF THE INVENTION

It is known in the prior art to offer a caller a discount for completing a telephone call if the caller agrees to be presented with an audible advertisement as part of the calling process. The advertisement may be presented prior to the routing, or completion, of the call, as in U.S. Pat. No. 4,850,007 issued to Marino et al. on Jul. 18, 1989, in lieu of ringing or busy signal, and even after the caller has completed his call to the called party.

SUMMARY OF THE INVENTION

I have recognized that such discount schemes are presently limited, in that the advertisements are only presented to the caller. Moreover, such advertisements are often not perceived by callers who use modems to place calls, e.g., data calls and facsimile (fax) calls, as the call progress monitoring, which would include listening to such advertisements, is typically handled by a machine. Such callers will be referred to hereinafter as a) "users" or b) "fax originators", since they cause origination of a call or connection over which a facsimile transmission travels but they do not participate directly in the communication.

In order to overcome the foregoing limitations, in accordance with the principles of the invention, a telephone network carrying a facsimile transmission transmitted by a user from a facsimile transmission source modifies the user's facsimile transmission by incorporating with the user's facsimile information at least one advertisement, so as to form a combination facsimile transmission that is transmitted to a destination specified by the user. The combined facsimile transmission, which includes the facsimile information transmitted by the user and the advertisement added in the telephone network, may be visually presented to the facsimile recipient, e.g., via a) a hard copy printout and/or b) a display, such as a computer screen.

A user's facsimile information is arranged into "sheets", each of which corresponds to a predefined amount of information, such as, for example, the information contained on an original paper page that was scanned by the user into a fax machine or a fixed unit of information generated in a computer. Typically, the size of a sheet is defined as a part of the facsimile transmission protocol, e.g., CCITT Group 3. In accordance with an aspect of the invention, one or more "sheets" of facsimile information contained within the original facsimile transmission of the user may have an advertisement included therewith. The advertisement incorporated with each sheet may be the same, or one or more of the sheets may have different advertisements.

In accordance with an aspect of the invention, the particular advertisements being incorporated with the user's facsimile information are independent of the content of the user's facsimile information, although they may be selected as a function of one or more parameters of the connection over which the facsimile transmission travels.

In accordance with an aspect of the invention, depending on the option chosen, the advertisement may a) be placed into any available "white space" in which it will fit on the sheet of the facsimile information, i.e., the advertisement will not overwrite any of the user's facsimile information, b) be placed in available white space only in the margin areas of the sheet, or c) the image of the sheet may be shrunk slightly and the advertisement placed in the resulting available white space. Ultimately, when the facsimile is printed or displayed, the advertisement will be printed or displayed as well. Optionally, in exchange for agreeing to the inclusion of the advertisement, the user and/or the person receiving the facsimile are granted a discount on the cost of the connection.

DETAILED DESCRIPTION

Figure 1:
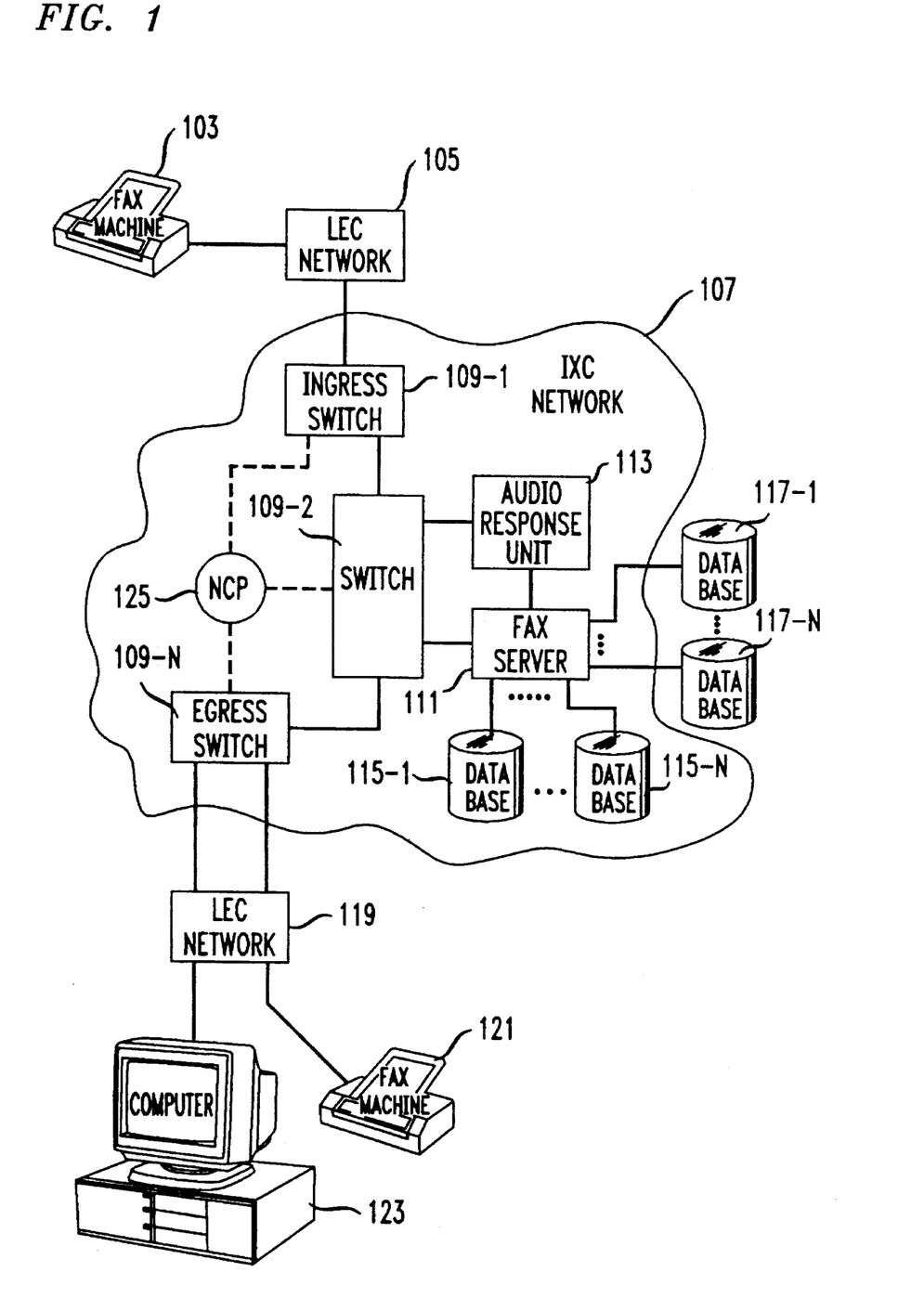
FIG. 1 shows an exemplary system in which a telephone network carrying a facsimile transmission transmitted by a user from a facsimile transmission source incorporates at least one advertisement with the user's facsimile information so as to form a combination facsimile transmission that is transmitted to a destination specified by the user, in accordance with the principles of the invention.

FIG. 1 shows an exemplary system in which a telephone network carrying a facsimile transmission transmitted by a user from a facsimile transmission source modifies the user's facsimile transmission by incorporating with the user's facsimile information at least one advertisement, so as to form a combination facsimile transmission that is transmitted to a destination specified by the user. The combined facsimile transmission, which includes the facsimile information transmitted by the user and the advertisement added in the telephone network, may be visually presented to the facsimile recipient, e.g., via a) a hard copy printout and/or b) a display, such as a computer screen. As an aspect of the invention, in exchange for permitting the advertisement to be included with the facsimile the facsimile originator may receive a discount on the cost of the facsimile transmission. Shown in FIG. 1 are a) originating fax machine 103, b) local exchange carrier (LEC) networks 105 and 119, c) interexchange carrier network 107, d) optional external facsimile databases 117, including databases 117-1 through 117-N, e) receiving fax machine 121, and f) receiving fax capable personal computer 123.

Originating fax machine 103 is employed by a user to originate facsimile transmissions of material that the user would like to transmit to an intended recipient, such as a person at 1) receiving fax machine 121 or 2) receiving fax capable personal computer 123. In one embodiment of the invention, a telephone call over which the fax transmission will pass is conventionally started by the person a) inserting the sheets of paper to be faxed, b) taking the telephone line to which originating fax machine 103 is connected off hook, and c) dialing the telephone number of the intended recipient's facsimile receiver.

The resulting telephone call passes through LEC network 105 in the conventional manner to IXC network 107. The selection of routing the call to IXC network 107 may be based on, for example, a) preselection for the telephone line on which the call is made, e.g., preselection of a long-distance carrier, b) the dialing of a carrier code, e.g., an interexchange carrier prefix code such as 10288 for AT&T, c) the dialing of a particular telephone number that must be carried by a particular carrier, e.g., an 800-type translatable telephone number.

The fax transmission is then processed and routed through IXC network 107, as will be described in more detail hereinbelow. The resulting processed fax transmission is then routed to LEC network 119. It is noted that LEC networks 105 and 119 may be the same. LEC network 119, in turn, routes the processed fax transmission to its ultimate intended destination, e.g., receiving fax machine 121 or receiving fax capable personal computer 123. The intended destination reconstructs the information contained within the received processed fax transmission and either a) immediately prints or displays the information or b) stores the information for future printing, displaying or further transmission.

IXC network 107 includes 1) switches 109, including ingress switch 109-1, switch 109-2 and egress switch 109-N; 2) fax server 111, 3) databases 115, including databases 115-1 to 115-N. Optionally included in IXC network 107 are audio response unit 113 and network control point (NCP) 125. Connected to fax server 111 may also be optional external databases 117.

Switches 109 switch calls to facilitate their completion to their intended destination. They may employ any switching technology, e.g., circuit switching or asynchronous transfer mode (ATM). It is noted that ingress switch 107-1, switch 109-2 and egress switch 109-N may all be the same switch, but they are shown separately for clarity of exposition.

Fax server 111 processes facsimile transmissions in accordance with the principles of the invention, as will be described herein further below. In order to receive and transmit fax transmissions, fax server is connected to switch 109-2, e.g., via an integrated services digital network (ISDN) primary rate connection. Optional audio response unit 113 interacts with callers, e.g., a) via commands conveyed as a series of dual tone multi-frequency (DTMF) tones, b) via audio announcements, and c) via speech recognition, to control the operation of fax server 111 to which it is connected.

Databases 115 and 117 store advertisements for incorporation into facsimile transmissions by fax server 111. Database 115, which includes databases 115-1 through 115-N, is a part of IXC network 107 while database 117, which includes databases 115-1 through 115-N, is external to IXC network 107. Database 117 is external to IXC network 107 so that databases 117-1 through 117-N can be located on the premises of advertisement suppliers, thus providing advertisement suppliers with a convenient way to update the advertisements that are incorporated into the facsimile transmissions of users. Indeed, if in accordance with an aspect of the invention a discount is given because an advertisement is incorporated with a user's facsimile transmission, the lost revenue incurred by the telephone network provider is typically defrayed by the advertisement provider.

The advertisements are stored in databases 115 and 117 as image data at a resolution suitable for incorporation with a user's facsimile information, e.g., at the standard resolution of specified for CCITT Group 3 compatible facsimile machines, which is approximately 200×100 dots per inch (dpi). Databases 115 and 117 or fax server 111 are capable of scaling the resolution of the advertisements upward or downward as necessary, to match the resolution of the user's facsimile information. This may be done by storing multiple versions of the advertisements or by using well known image processing techniques. If necessary, fax server 111 communicates the resolution of the user's facsimile to the database storing the selected advertisement.

None, all, or particular ones of the calls processed by IXC network 107 may be routed NCP 125. For example, calls to translatable telephone numbers, e.g., 800-type telephone numbers, have their routing determined by NCP 125. Information is communicated between switches 109 and NCP 125 via a signaling network (represented by dashed lines), e.g., using a signaling protocol such as common channel signaling system 7. Additionally, NCP 125 may store information and may receive from switches 109 other information over the signaling network that is employed in the processing and routing of calls.

Figure 2:
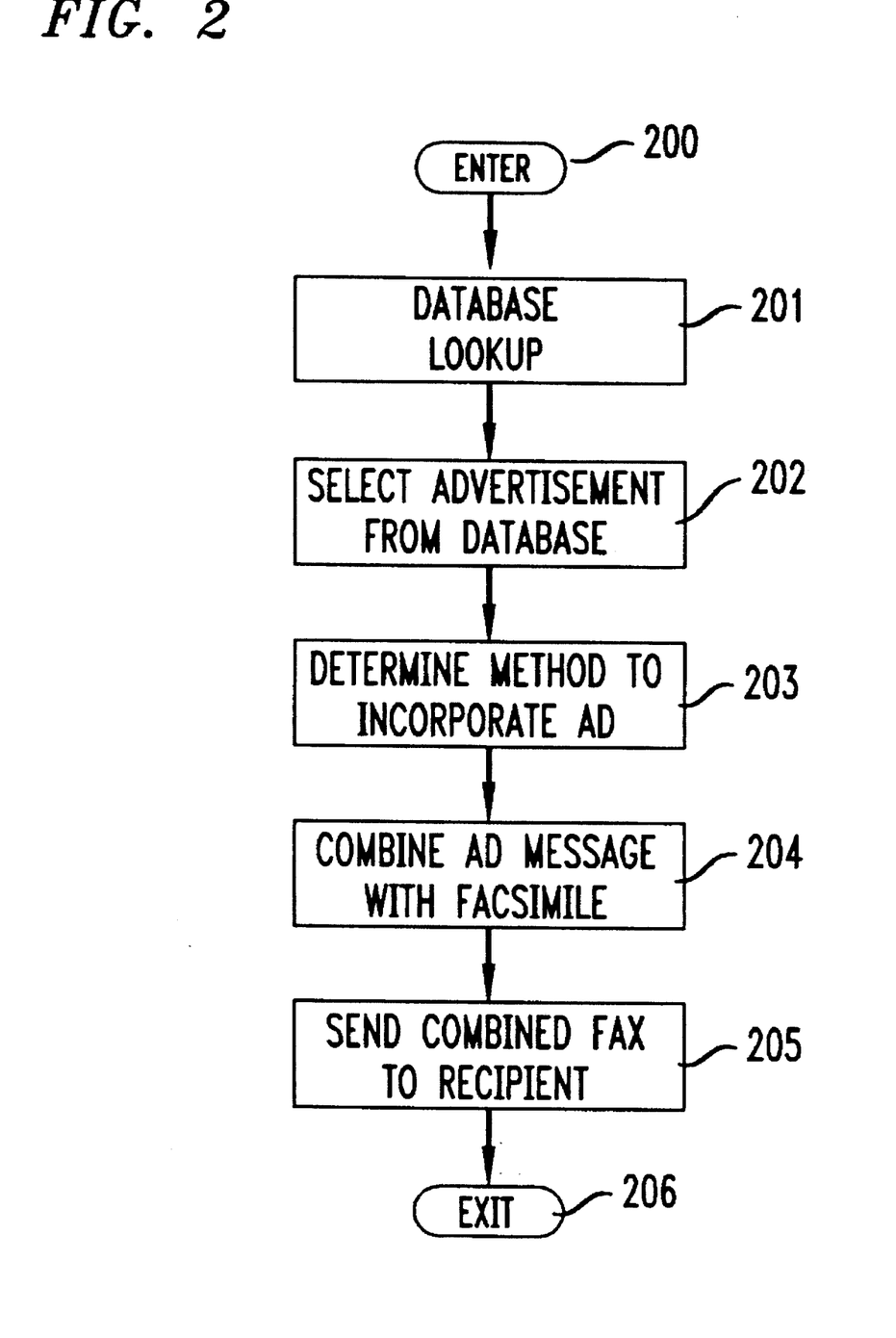
FIG. 2 shows an exemplary process for incorporating an advertisement with a user's facsimile transmission, in accordance with the principles of the invention.

FIG. 2 shows an exemplary process for incorporating an advertisement with a user's facsimile information into a single combined facsimile transmission, in accordance with the principles of the invention. The process is entered in step 201, when a user's facsimile transmission is connected by switch 109-2 to fax server 111. A user's facsimile transmission may be connected to fax server 111 in response to, for example, 1) presubscription by the user, 2) presubscription by the fax recipient, 3) signals supplied by the user on a per-connection basis for the particular transmission, or 4) the establishment of a connection to a predefined discount fax service telephone number. In step 203, fax server 111 selects an advertisement from the collective database of advertisements available, which includes database 115 and/or database 117.

Next, fax server 111 determines the method by which to incorporate the advertisement with a "sheet" of the received facsimile information, in step 205. A "sheet" of facsimile information corresponds to a predefined amount of information, such as, for example, the information contained on an original paper page that was scanned by the user into a fax machine or a fixed unit of information generated in a computer. Typically, the size of a "sheet" is defined as a part of the facsimile transmission protocol, e.g., CCITT Group 3.

The methods for incorporating an advertisement with a sheet of facsimile information include placing the advertisement a) into any available "white space" on the sheet of the facsimile information in which it will fit, b) into available white space only in the margin areas, or c) in the available white space that results from an intentional slight shrinking of the image of the sheet by fax server 111. The particular method chosen may be determined based on 1) presubscription by the fax originator, 2) presubscription by the fax recipient, or 3) a per-connection basis in response to signals, e.g., dual tone multi-frequency (DTMF) signals or voice commands which are received by audio response unit 113.

In step 207 the user's facsimile information is combined with the selected advertisement in the space determined in step 205, in accordance with the principles of the invention. The resulting combined facsimile information and advertisement is transmitted in step 209 from fax server 111 to the ultimate intended destination, e.g., receiving fax machine 121 or receiving fax capable personal computer 123, in accordance with an aspect of the invention. The image produced in response to the receipt of the facsimile transmission from fax server 111, which includes the combined facsimile information and advertisement, is then printed out or displayed for use by the recipient. The process is then exited in step 211.

Advantageously, in accordance with an aspect of the invention, a discount may be given to the party paying for the connection over which the user's facsimile transmission passes in exchange for that party's agreeing to permit the advertisement to be incorporated into the facsimile transmission. This may be carried out by having fax server 111 transmit a message to switch 109-2 instructing it to grant the discount. Alternatively, if fax server 111 terminates predetermined telephone numbers, the billing system of switch 109-2 may be preprogrammed to bill calls to those telephone numbers at a reduced rate as compared to other telephone calls carrying facsimile transmissions and are not processed by fax server 111. Further advantageously, in accordance with another aspect of the invention, if the method used to incorporate the advertisement is selected at random for each call, then it should not be possible for the intended recipient to arrange an algorithm by which the ultimate intended destination automatically removes the advertisement, thereby defeating the intention of the invention and the reason for the granting of a discount.

Figure 3:
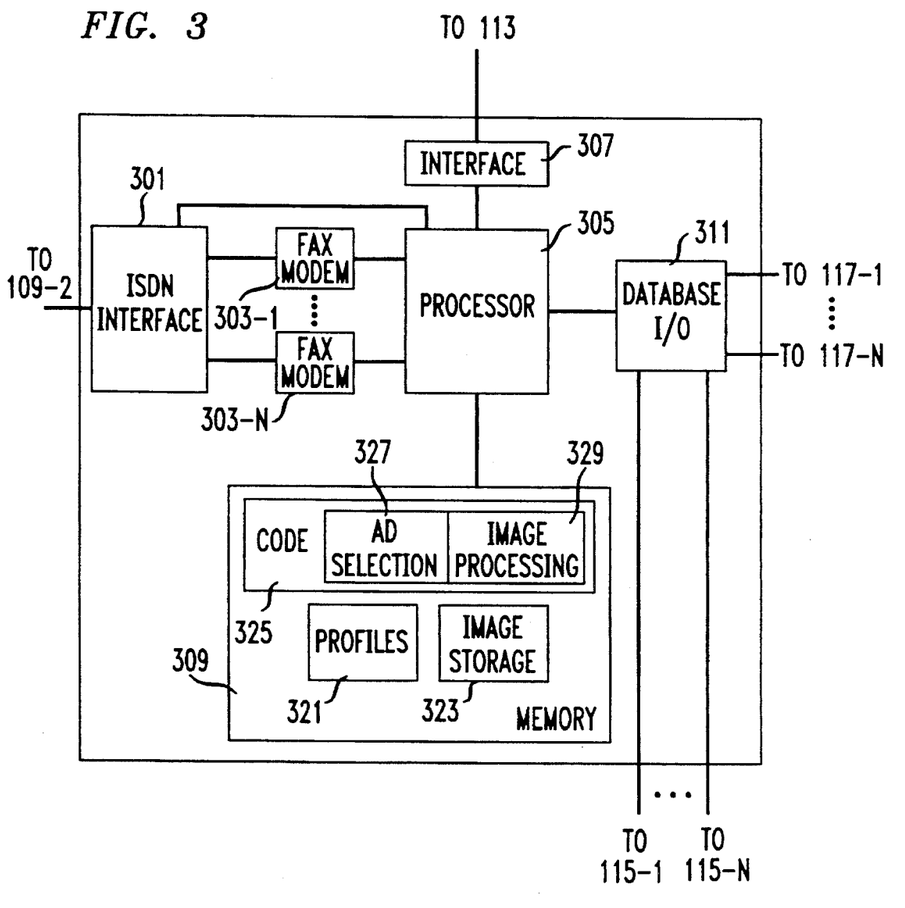
FIG. 3 shows a more detailed exemplary view of the fax server of FIG. 1.

FIG. 3 shows a more detailed exemplary view of fax server 111. Fax server 111 includes: a) ISDN interface 301, b) fax modems 303, including fax modems 303-1 through 303-N, c) processor 305, d) interface 307, e) memory 309, and f) database input/output (I/O) unit 311. ISDN interface 301 contains all the circuitry necessary to terminate an ISDN primary rate link connecting fax server 111 with switch 109-2. Via ISDN interface 301, each of the bearer (B) channels on the ISDN primary rate link is connected to a respective one of fax modems 303 and the data (D) channel is connected to processor 305. Fax modems 303 receive and decode facsimile transmissions into facsimile information and encode and transmit facsimile information into facsimile transmissions. It is noted that the facsimile information represents at least one images and that the facsimile information is typically divided into sheets, with each sheet being a separate image. Processor 305 provides all the computational capability necessary to control the overall operation of fax server 111. Processor 305 contains is connected to all the other elements of fax server 111.

Interface 307 provides a communication path for connecting processor 305 to audio response unit 113. Such a link may be, for example, an X.25 link, an RS-232 line, or a parallel connection.

Memory 309 stores necessary for the operation of fax server 111. Memory 309 includes profiles 321, image storage 323 and code 329. Profiles 321 include information about the types of advertisements that should be incorporated with facsimile transmissions originating at or destined for particular telephone numbers. Image storage 323 temporarily stores the facsimile information while a facsimile transmission is being processed. Code 329 is used to store the computer instructions which operate processor 305. In particular, code 329 includes advertisement (ad) selection software 327 and image processing software 309.

Database I/O 311 is a communication subsection that provides processor 305 with access to databases 115 and 117. For example, database 115 may employ CD-ROMs for storage while database 117 may employ hard disk storage and database I/O 311 provides the necessary interfacing and protocol conversion, if any. Thus, processor 305 can access the stored information without requiring information about the media on which it is stored.

In one embodiment of the invention, the user originates his facsimile connection from originating fax machine 103 to a predetermined telephone number that terminates at one of fax modems 303 within fax server 111. Audio response unit 113 is also automatically bridged onto the call by switch 109 in response to a command from processor 305. The user then supplies signals, e.g., DTMF tones, that indicate the telephone number of the desired destination. These signals are received and translated by audio response unit 113 and supplied to processor 305 via interface 307. Upon receipt of the information specifying the destination, a) the one of fax modems 303 within fax server 111 begins to transmit a "ready-to-receive" tone and b) audio response unit 113 is disconnected from the call in response to a command from processor 305.

Thereafter, fax server 111 receives the user's facsimile transmission, decodes it into data, and stores the resulting user's facsimile information in image storage 323. The call with originating fax machine 103 may then be disconnected.

One or more advertisements that are stored in databases 115 or 117 are then selected by processor 305, which executes ad selection software 327 of code 325, for incorporation with the user's facsimile information. The advertisements may be chosen, for example, as a function of a) the calling telephone number, as determined by automatic numbering identification (ANI), or b) the telephone number of the destination. For example, a profile of the types of advertisements that are appropriate for particular destinations may be stored in profiles 321 of memory 309, and fax server 111 randomly selects an advertisement of suitable type from database 115, in which the advertisements are stored tagged by type.

The methods for incorporating an advertisement with a sheet of facsimile information which includes, as noted above, placing the advertisement which includes a) into any available "white space" on the sheet of the facsimile information in which it will fit, b) into available white space only in the margin areas, or c) in the available white space that results from an intentional slight shrinking of the image of the sheet by fax server 111 is either selected at random by fax server 1111 or is selected by the user as part of the interaction with audio response unit 113 by which the desired destination is supplied. In the event that the advertisement is to be placed into any available "white space" on the sheet of the facsimile information in which it will fit, the sheet is processed using conventional area recognition techniques of image processing to determine the available white space areas and their sizes. Software for implementing such techniques are stored in image processing 329 of code 325. One advertisement may be incorporated onto the sheet in the largest area found or several advertisements may be incorporated into the sheet if more than one area of white space is found, e.g., one advertisement per area.

If one area only is to be used, the area selected may be the one that is determined to be the least intrusive on the user's information, e.g., the area most likely to correspond to a margin along the edge of the sheet. If the advertisement may be placed only into available white space only in the margin areas, then only areas of white space that are a respective predetermined distance from each edge of the sheet may be used for incorporating advertisements. If no areas of white space are available within the predetermined distances, no advertisement can be included with the sheet, unless it is permitted to shrink the entire image of the sheet.

If there are no areas of white space available within the predetermined distances and it is permitted to shrink the entire image of the sheet, or the user has chosen the option of shrinking the entire image of the sheet, image processing techniques, the software for which is stored in image processing 329 of code 325, are employed to reduce the size of the image of the sheet so that white space is created. The shrunken image is placed on a new sheet of information so that there is at least one margin area of white space. At least one advertisement is then incorporated into the now available at least one area of white space. The resulting combination is stored in image storage 323.

Once each sheet of the user's facsimile information is processed, and advertisements incorporated therewith as appropriate, processor 305 causes switch 109 to establish a call from an available fax modem of fax server 111 to the telephone number of the user's desired destination. Upon successfully connecting to a fax modem at the user's desired destination, fax server 111 transmits the resulting new sheets of combined facsimile information and advertisement from image storage 323 to the destination, via one of fax modems 303. The user's information and the advertisement are then printed or displayed at the destination.

In another embodiment of the invention, fax detection is performed at the edge of IXC network 107, e.g., at ingress switch 109-1, or even in LEC network 105. The user's facsimile data is extracted from the facsimile transmission and reformatted for transmission as data, e.g., via an ATM network. In such an embodiment switches 109 are ATM switches. Recognizing that the data being carried in the ATM stream is facsimile information, the data is routed via switch 109-2 to fax server 111. Fax server 111 then incorporates the advertisement with the user's facsimile information and transmits the resulting combined data signal to the edge of the network, at which data to facsimile reconversion takes place. The new facsimile transmission is then supplied to the destination. If, for example, the advertisement is a fixed size and an area of white space of the same fixed size will always be available on a sheet of user facsimile information, then the advertisement may be incorporated into the data stream on the fly.

It is noted that in other embodiments of the invention audio response unit 113 may be incorporated into fax server 111.

Figure 4A:
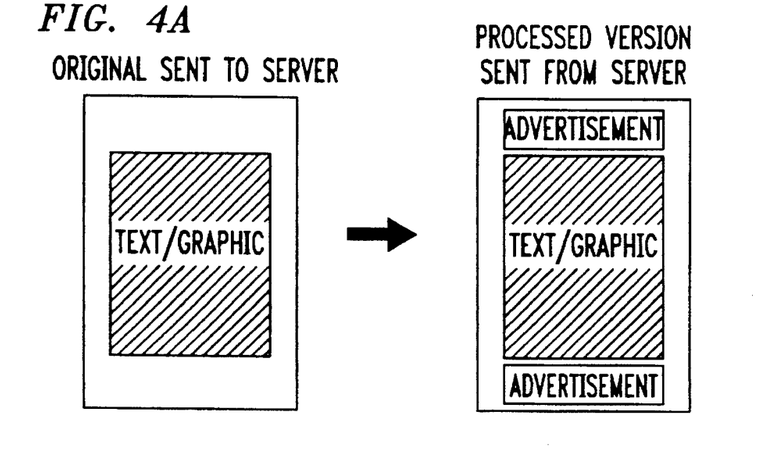
FIGS. 4a, 4b, and 4c each shows an exemplary layout of an original sheet of facsimile information and an exemplary layout of the resulting combined sheet of facsimile information and advertisement.
Figure 4B:
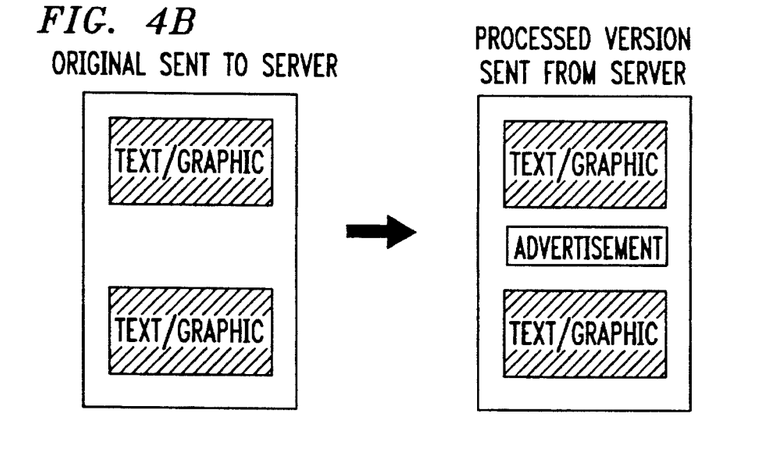
Figure 4C:
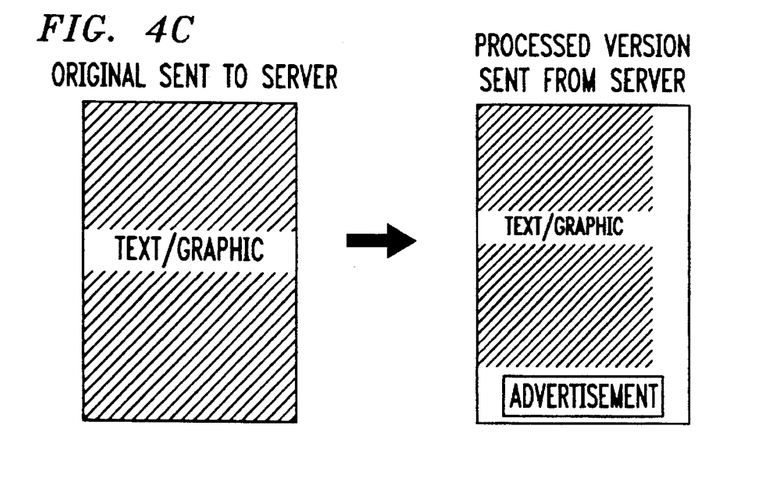

FIGS. 4a, 4b, and 4c each shows an exemplary layout of an original sheet of facsimile information that was transmitted to fax server 111 and an exemplary layout of the resulting combined sheet of facsimile information and advertisement that is transmitted from fax server 111 to the user's desired destination. In FIG. 4a two advertisements are incorporated to the user's facsimile information in forming the combined facsimile information and advertisement. One advertisement is incorporated into the upper margin of the sheet while the other advertisement is incorporated into the lower margin of the sheet. In FIG. 4b a single advertisement is added to the to the user's facsimile information in available white space that is located in the middle of the sheet. In FIG. 4c the user's facsimile information occupies the entire sheet so that the entire sheet must be shrunk slightly in order to incorporate an advertisement in the lower margin of a new sheet into which the shrunken sheet is placed.

It is noted that the destination may be connected to the telephone network via a wireless link.

It is also noted that advertisement is used herein in accordance with its broader definition of public announcement or notice and is meant to be limited merely to information for selling a product. However, an advertisement is more than the mere date/time stamp, page number and station identifications that are often automatically imprinted upon the receiving of a fax at a conventional fax machine.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. Apparatus for use in a telephone network for completing a connection carrying one or more sheets of facsimile information, each of said sheets being for visual presentation or storage at the receiving end of said connection, comprising:

means for receiving at least one of said sheets of facsimile information;

means for incorporating an advertisement together with information derived from a portion of said at least one of said sheets of facsimile information to form a sheet of combined facsimile information and advertisement; and means for transmitting said combined sheet of facsimile information and advertisement to said receiving end of said connection in lieu of said received one or more sheets of facsimile information.

2. The invention as defined in claim 1 wherein said advertisement is selected independent of the content said received at least one of said sheets of facsimile information.

3. The invention as defined in claim 1 further including means for discounting a charge for carrying said connection in response to transmission of said combined sheet of facsimile information and advertisement.

4. The invention as defined in claim 1 further including means for selecting said advertisement from a plurality of available advertisements as a function of at least one parameter of said connection.

5. The invention as defined in claim 1 further including means for selecting said advertisement at random from a plurality of available advertisements.

6. The invention as defined in claim 1 wherein said means for incorporating incorporates more than one advertisement with said at least one of said sheets of facsimile information.

7. The invention as defined in claim 1 wherein said means for incorporating incorporates said advertisement in any available white space on said at least one of said sheets in which said advertisement fits.

8. The invention as defined in claim 1 wherein said means for incorporating incorporates said advertisement in any available white space only within the margin of said at least one of said sheets.

9. The invention as defined in claim 1 wherein said means for incorporating further includes means for shrinking said at least one of said sheets and wherein said advertisement is incorporated in the resulting white space.

10. The invention as defined in claim 1 wherein said means for incorporating selects a location of said at least one of said sheets for incorporating said advertisement at random from among a plurality of available locations.

11. The invention as defined in claim 1 wherein said means for incorporating selects a method for incorporating said advertisement at random from among a plurality of available methods.

12. The invention as defined in claim 1 wherein said means for incorporating incorporates said advertisement on the fly.

13. The invention as defined in claim 1 wherein said means for receiving terminates a first call over which said facsimile information passes and said means for transmitting originates a second call over which said combined sheet of facsimile information and advertisement passes, so that said connection comprises said apparatus and said first and second calls.

14. The invention as defined in claim 1 wherein:

said means for receiving also receives at least another of said sheets of facsimile information;

said means for incorporating forms a second combined sheet of facsimile information and advertisement from said other of said sheets of facsimile information and a second advertisement; and said means for transmitting also transmits said second combined sheet of facsimile information and advertisement to said receiving end of said connection in lieu of said second sheet of facsimile information.

15. The invention as defined in claim 14 wherein said other sheet of facsimile information is received by said means for receiving after said first sheet is received.

16. The invention as defined in claim 14 wherein said second advertisement is the same as said advertisement.

17. The invention as defined in claim 14 wherein said second advertisement is different from said advertisement.

18. Apparatus for use in a telephone network for completing connections carrying facsimile information to a destination, comprising:

means for connecting a facsimile transmission carrying said facsimile information to a facsimile processor;

means in said facsimile processor for combining said facsimile information with a prestored graphical advertisement into a new combined facsimile transmission; and means for transmitting said new combined facsimile transmission to said destination.

19. Apparatus for use in a telephone network for completing a connection carrying one or more sheets of facsimile information, each of said sheets being for visual presentation or storage at the receiving end of said connection, comprising:

means for intercepting at least one of said sheets of facsimile information;

means for incorporating supplemental information together with information derived from a portion of said at least one of said sheets of facsimile information to form a supplemented sheet of facsimile information; and means for transmitting said supplemented sheet of facsimile information to said receiving end of said connection in lieu of said received one or more sheets of facsimile information.

20. Apparatus for use in completing a connection carrying one or more sheets of facsimile information, each of said sheets being for visual presentation at the receiving end of said connection, comprising:

means for receiving at least one of said sheets of facsimile information;

means for selecting an advertisement from a database of available graphical/textual advertisements;

means for incorporating said selected advertisement together with information derived from a portion of said at least one of said sheets of facsimile information and supplying the result as an output; and means for transmitting the output of said means for incorporating for display or printout at a receiver.

21. The invention as defined in claim 20 further wherein said means for selecting selects said advertisement as a function of a parameter of said connection.

22. The invention as defined in claim 21 wherein said parameter of said connection is the destination location.

23. The invention as defined in claim 21 wherein said parameter of said connection is the origination location.

24. A method for use in processing a facsimile transmission in a telephone network, said facsimile transmission carrying at least one sheet of facsimile information, the method comprising the steps of:

combining said at least one sheet of facsimile information with an advertisement; and transmitting the resulting combination to a receiving facsimile transmission capable unit.

25. The invention as defined in claim 24 further including the step of discounting a charge levied by said telephone network for connecting an originating facsimile transmission capable unit to said receiving facsimile transmission capable unit.

26. The invention as defined in claim 24 further including the step of displaying the resulting combination at said facsimile transmission capable unit.

27. The invention as defined in claim 24 further including the step of printing a hard copy of the resulting combination at said facsimile transmission capable unit.

28. The invention as defined in claim 24 wherein said combining step further includes the steps of:

receiving said facsimile transmission;

selecting an advertisement from among a plurality of available advertisements;

locating an area of white space on said sheet of facsimile information into which said selected advertisement may be incorporated; and incorporating said advertisement with said facsimile information.

29. A method for use in a telephone network for completing a connection carrying one or more sheets of facsimile information, each of said sheets being for visual presentation or storage at the receiving end of said connection, the method comprising the steps of:

receiving at least one of said sheets of facsimile information;

incorporating an advertisement together with information derived from a portion of said at least one of said sheets of facsimile information to form a sheet of combined facsimile information and advertisement; and transmitting said combined sheet of facsimile information and advertisement to said receiving end of said connection in lieu of said received one or more sheets of facsimile information.

30. A method for use in a telephone network for completing transmission of facsimile information from a facsimile capable source to a facsimile capable receiver, the method being characterized by the step of adding advertisement information that is selected from a plurality of prestored advertisements to said facsimile information from said facsimile capable source to produce a unified facsimile information-advertisement transmission for transmission to said facsimile capable receiver.

31. A method for use in a telephone network for completing transmission of facsimile information from a facsimile capable source to a facsimile capable receiver, the method being characterized by the step of combining an image represented by said facsimile information with information representing an advertisement in the form of a graphical image that is selected from a plurality of prestored advertisements to produce a combined image, in which the content of said image represented by said facsimile information is undisturbed, for transmission to said facsimile capable receiver.

32. A method for processing a facsimile connection in a telephone network comprising the steps of:

receiving a facsimile transmission from a facsimile capable source of a user, said facsimile transmission containing at least one sheet of user facsimile information representing a graphical image;

selecting an advertisement from a plurality of available advertisements, said advertisement being an image;

scaling said selected advertisement to a resolution matching that of said graphical image represented by said user's facsimile information;

locating available white space in said graphical image represented by said user's facsimile information into which said selected advertisement fits;

placing said advertisement into said located white space to form a combined image; and transmitting a facsimile representation of said combined image to a facsimile capable receiver.

33. The invention as defined in claim 32 wherein said locating step is limited to locating white space along the margins of a sheet of said graphical image.

34. The invention as defined in claim 32 wherein locating step includes the step of shrinking the size of said graphical image represented by said user's facsimile information in scale to produce available white space.

35. The invention as defined in claim 32 wherein said selecting is performed as a function of a parameter of said connection.

36. The invention as defined in claim 32 wherein a discount is granted for the charge for said connection only if said receiving, selecting, scaling, locating, placing, and transmitting steps are successfully completed.

37. The invention as defined in claim 32 wherein in said scaling step said selected advertisement is scaled 1:1.

\* \* \* \* \*